US011165635B2

(12) United States Patent
Russell et al.

(10) Patent No.: US 11,165,635 B2
(45) Date of Patent: Nov. 2, 2021

(54) SELECTING AND CONFIGURING MULTIPLE NETWORK COMPONENTS IN ENTERPRISE HARDWARE

(71) Applicant: Dell Products L.P., Round Rock, TX (US)

(72) Inventors: Deborah C. Russell, Austin, TX (US); Jason Garret Bauer, Round Rock, TX (US); Lauren Sarah Lyn, New Hartford, CT (US); Samuel Aaron Prince, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 16/127,385

(22) Filed: Sep. 11, 2018

(65) Prior Publication Data

US 2020/0084099 A1 Mar. 12, 2020

(51) Int. Cl.
*G06F 15/177* (2006.01)
*H04L 12/24* (2006.01)

(52) U.S. Cl.
CPC ........ *H04L 41/0806* (2013.01); *H04L 41/082* (2013.01); *H04L 41/0879* (2013.01)

(58) Field of Classification Search
None
See application file for complete search history.

(56) References Cited

U.S. PATENT DOCUMENTS 8,625,596 B1 * 1/2014 Thomas .............. H04L 41/0876 370/351
8,874,705 B1 * 10/2014 Satish .................. G06F 11/008 709/220
2007/0283286 A1 * 12/2007 Ashok ..................... H04L 69/16 715/764
2009/0228579 A1 * 9/2009 Sanghvi .............. H04L 41/0843 709/224
2013/0308492 A1 * 11/2013 Baphna ............... H04L 41/0803 370/254
2015/0372911 A1 * 12/2015 Yabusaki ................ H04L 67/34 709/226

* cited by examiner

*Primary Examiner* — Anh Nguyen
(74) *Attorney, Agent, or Firm* — Baker Botts L.L.P.

(57) ABSTRACT

Methods, systems, and apparatus, including computer programs encoded on a computer storage medium, for identifying data indicating respective hardware profiles of the server computing systems; analyzing the hardware profiles, including: detecting, for each of the server computing systems, a model type of the server computing system, and detecting, for each model type of the server computing systems, a module configuration of the server computing system; grouping, for each model type, each server computing system that is associated with a same module configuration into a set of server computing systems; receiving user input indicating selection of at least one set of server computing systems; determining that, for at least one set of server computing systems, that a respective module configuration is to be applied globally based on the user input; and applying the respective module configuration to the at least one set of server computing systems.

12 Claims, 14 Drawing Sheets

�005 302

⚠ Warning: Configuring I/O Modules will override the current configurations and may require a reboot Total Number of Chassis               6

Chassis Model(s)                      M1000e, PowerEdge FX2

☑ Configure I/O Modules

�005 306

SELECTING AND CONFIGURING MULTIPLE NETWORK COMPONENTS IN ENTERPRISE HARDWARE

BACKGROUND

Field of the Disclosure

The disclosure relates generally to information handling systems, and, more particularly, to a system and method for detecting and grouping of hardware profiles and corresponding server computing systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems can include server computing systems and/or networking components. In general, when configuring various server computing systems (e.g., 1U, 2U, or chassis-style), the workflow for network components is often underrepresented or poorly implemented. For example, rack unit servers can offer support for 2, 4, or 6 modules. A user can customize the modules to support different port types (e.g., 10G base T, Fibre Channel (FC), Small form-factor pluggable (SFP+)). However, configuring the modules can be difficult utilizing conventional workflows. For example, some workflows can require the user to access individual module interfaces while other workflows aggregate configurations.

SUMMARY

Innovative aspects of the subject matter described in this specification may be embodied in systems that includes a hardware profile identification engine that identifies respective hardware profiles of the server computing systems; a hardware profile analysis engine that i) detects, for each of the server computing systems, a model type of the server computing system, and ii) detects, for each model type of the server computing systems, a module configuration of the server computing system; a system grouping engine that groups, for each model type, each server computing system that is associated with a same module configuration into a set of server computing systems, and provides, for display, data indicating, for each set of server computing systems, the model type and the module configuration of the set of server computing systems; and a module configuration application engine that determines that, for at least one set of server computing systems, that a respective module configuration is to be applied globally, and, applies the respective module configuration to at least one set of server computing systems.

Other embodiments of these aspects include corresponding methods, apparatus, and computer programs, configured to perform the actions of the methods, encoded on computer storage devices.

These and other embodiments may each optionally include one or more of the following features. For instance, the hardware profile identification engine further receives, from each server computing system, data indicating a configuration status of the respective server computing system, the configuration status indicating whether the respective server computing system is configurable. The data further indicating an uplink configuration status of the respective server computing system, the uplink configuration status indicating whether a respective configuration can be applied to the modules of the server computing system. The hardware profile analysis engine further identifies, for each model type of the server computing systems, a format of the modules of the server computing system, wherein the data indicating the model type and the module configuration for one or more of the server computing systems is provided for display by the configuration management system. A port validation engine that validates one or more ports of each module of each server computing system to determine whether the respective configuration can be applied to the ports of the modules of the server computing system. The hardware profile analysis engine further determines, for each model type of the server computing systems, that each module configuration differ, and wherein the system grouping engine further groups, in response to the determining, each server computing system that is associated with a same port type of the modules.

Innovative aspects of the subject matter described in this specification may be embodied in methods that include the actions of identifying, by a configuration management system, data indicating respective hardware profiles of the server computing systems; analyzing, by the configuration management system, the hardware profiles, including: detecting, for each of the server computing systems, a model type of the server computing system, and detecting, for each model type of the server computing systems, a module configuration of the server computing system; grouping, by the configuration management system, for each model type, each server computing system that is associated with a same module configuration into a set of server computing systems; providing, for display, data indicating, for each set of server computing systems, the model type and the module configuration of the set of server computing systems; receiving user input indicating selection of at least one set of server computing systems; determining, by the configuration management system, that, for at least one set of server computing systems, that a respective module configuration is to be applied globally based on the user input; and applying, by the configuration management system, the respective module configuration to the at least one set of server computing systems.

Other embodiments of these aspects include corresponding systems, apparatus, and computer programs, configured to perform the actions of the methods, encoded on computer storage devices.

These and other embodiments may each optionally include one or more of the following features. For instance, receiving, at the configuration management system and from each server computing system, data indicating a configuration status of the respective server computing system, the configuration status indicating whether the respective server computing system is configurable. The data further indicating an uplink configuration status of the respective server computing system, the uplink configuration status indicating whether a respective configuration can be applied to the modules of the server computing system. Identifying, for each model type of the server computing systems, a format of the modules of the server computing system; and providing for display, data indicating the model type and the module configuration for one or more of the server computing systems. Validating one or more ports of each module of each server computing system, the validating including determining whether the respective configuration can be applied to the ports of the modules of the server computing system. Updating a database based on the model type and the module configuration of each server computing system. Determining, for each model type of the server computing systems, that each module configuration differs; and in response to the determining, grouping, by the configuration management system, each server computing system that is associated with a same port type of the modules.

Particular implementations of the subject matter described in this specification can be implemented so as to realize one or more of the following advantages. For example, the workflow for module configuration is simplified to provide minimal user input to an interface of a configuration management system. This reduces errors for configuration of multiple server computing systems—the number of steps and potential error is reduced by minimizing the number of inputs that are needed to be provided by the user that is performing such configuration.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
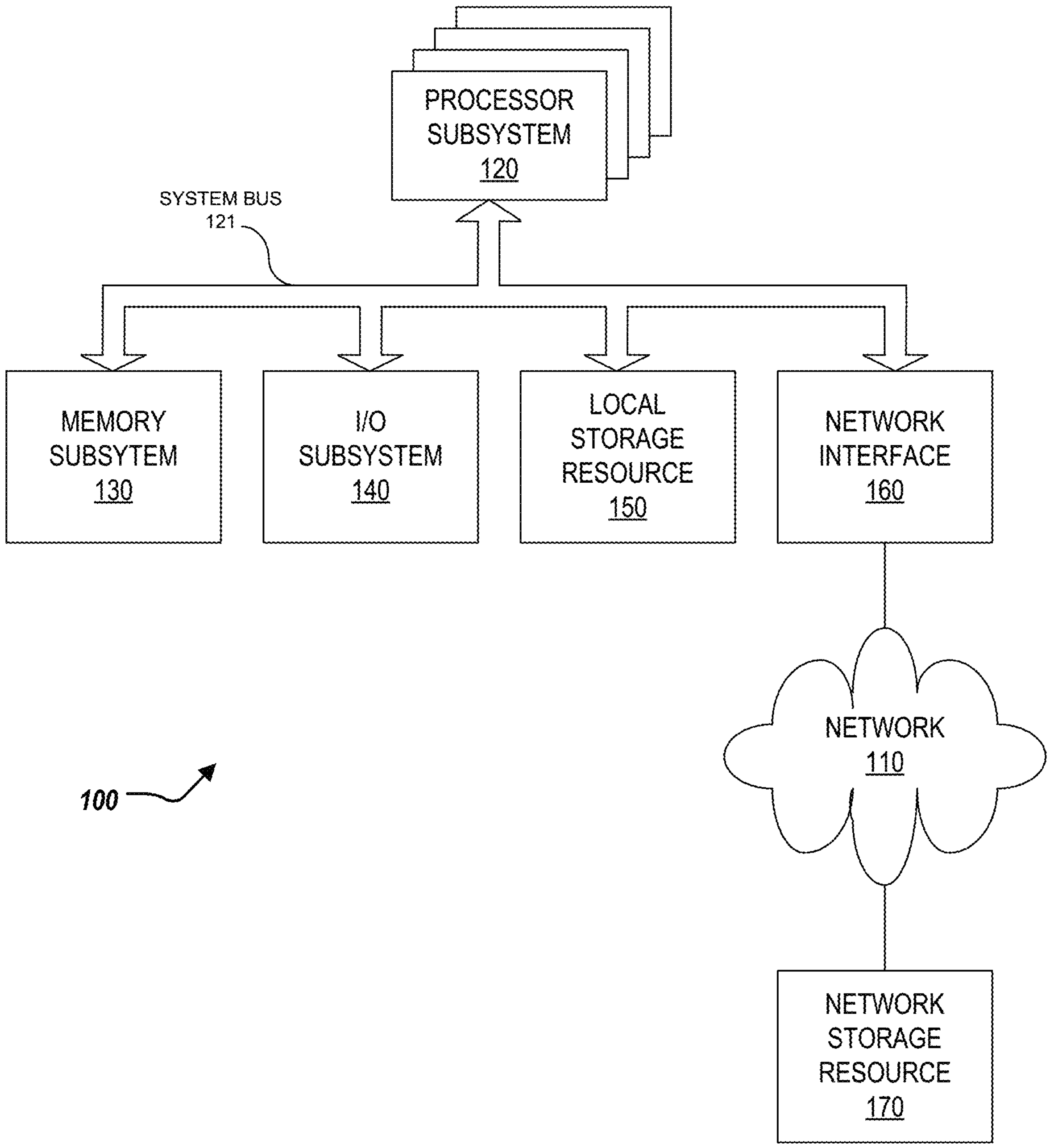
FIG. 1 is a block diagram of selected elements of an embodiment of an information handling system.

This document describes methods, systems, and computer readable medium for detecting and grouping of hardware profiles and corresponding server computing systems. Specifically, this document discusses configuration of module port settings such that a configuration management system can detect hardware that dynamically represents physical devices and connections, provides directed workflows for the detected hardware, and provides an architecture (e.g., API) for handling such. The configuration management system can facilitate configuration of ports on a module while an interface provided by the configuration management system accounts for various rules to minimize, if not prevent, configuration errors. Additionally, during the configuration process provided by the configuration management system, the interface can provide for display a chassis model type (e.g., Dell EMC PowerEdge FX2, Dell PowerEdge M1000e, etc.) and a number of modules installed and detected, including port types, and fabric slots utilized.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-12 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
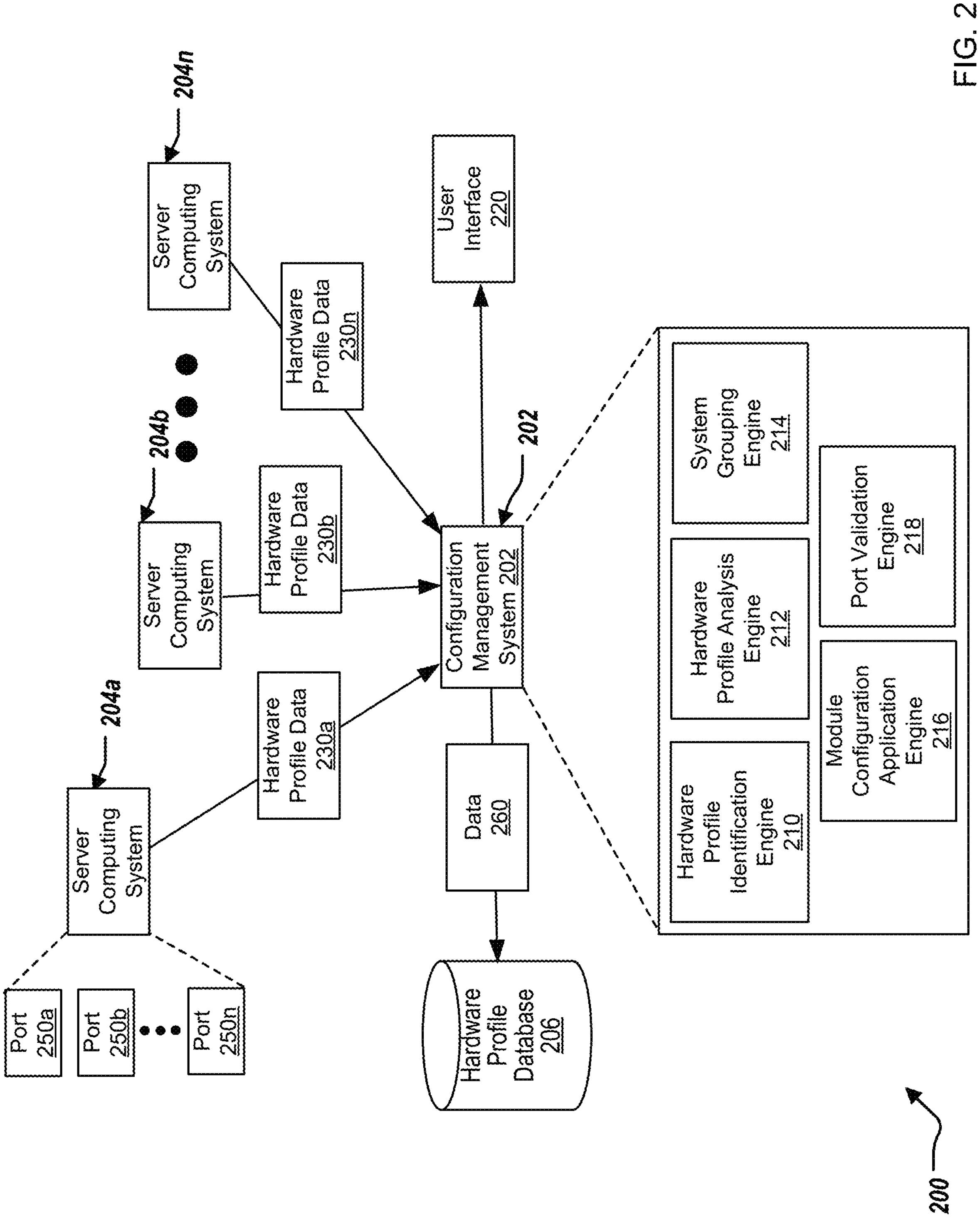
FIG. 2 depicts a system for detecting and grouping of hardware profiles and corresponding server computing systems.

Turning now to FIG. 2, FIG. 2 depicts a system 200 for detecting and grouping of hardware profiles and corresponding server computing systems. The system 200 includes a configuration management system 202, server computing systems 204*a*, 204*b*, 204*n* (referred to as server computing systems 204), and a hardware profile database 206. The configuration management system 202 can correspond to the information handling system 100 of FIG. 1. The system 200 can include any number of server computing systems 204. The configuration management system 202 can be in communication with the server computing systems 204 and the database 206 over one or more networks (not shown).

The configuration management system 202 can include a hardware profile identification engine 210, a hardware profile analysis engine 212, a system grouping engine 214, a module configuration application engine 216, and a port validation engine 218. In some examples, each of the hardware profile identification engine 210, the hardware profile analysis engine 212, the system grouping engine 214, the module configuration application engine 216, and the port validation engine 218 can be a separate computing system, or a combination of computing systems. In some examples, each of the hardware profile identification engine 210, the hardware profile analysis engine 212, the system grouping engine 214, the module configuration application engine 216, and the port validation engine 218 are in differing sets of physical hardware, or in a same set of physical hardware.

In some examples, the server computing systems 204 can include various rack units, for example, 1U, 2U, or chassis-style server type. The server computing systems 204 can include ports 250*a*, 250*b*, . . . , 250*n* (referred to as ports 250). The ports 250 can include such ports as SFP, SFP+, QSFP+(Quad (4-channel) small form-factor pluggable), 10 G Base-T, and/or Fibre Channel (FC). For simplicity of illustration, only server computing system 204*a* is shown including ports 250.

The configuration management system 202 can further provide for display a graphical user interface (GUI) 220. The GUI 220 can provide for display data related to the server computing systems 204, and in particular, data relating to respective configurations of the server computing systems 204, described further in detail herein.

In some implementations, the configuration management system 202, and in particular, the hardware profile identification engine 210, identifies data that indicates respective hardware profiles of the server computing systems 204. Specifically, each of the server computing systems 204*a*, 204*b*, . . . , 204*n* can include hardware profile data 230*a*, 230*b*, 230*n*, respectively (referred to as hardware profile data 230). In some examples, the hardware profile identification engine 210 can receive the hardware profile data 230 in response to a request provided to the server computing systems 204 by the configuration management system 202, or upon detection of the server computing systems 204 by the configuration management system 202. In some examples, the hardware profile identification engine 210 can receive the hardware profile data 230 automatically, or periodically.

The hardware profile data 230 can include data related to a respective server computing system 204, such as chassis model type, and module configuration of the respective server computing system 204. In some examples, the hardware profile data 230 can include data such as switch information, server information, operating system (OS) information, or other identifying information of the respective server computing system 204. In some examples, the hardware profile data 230 further includes serial number, configuration data, and uplink configuration data, described further herein. In some examples, the hardware profile data 230 can be in a .json format.

Figure 3A:
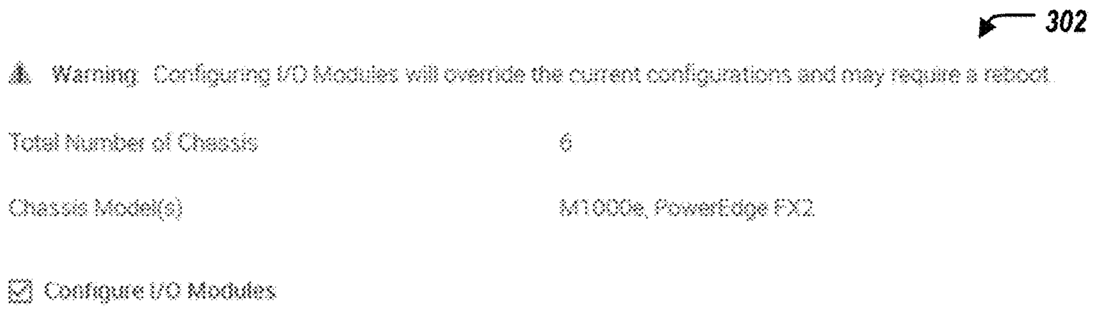
FIG. 3A illustrates an example interface displaying the total number of server computing systems and their model type identification of the server computing systems.

In some implementations, the configuration management system 202, and in particular, the hardware profile analysis engine 212, analyzes the hardware profile data 230. In some examples, the hardware profile analysis engine 212 detects, for each of the server computing systems 204, a (chassis) model type of the server computing system 204. Referring to FIG. 3A, the configuration management system 202 can provide for display on the GUI 220 an example interface 302 for model type identification of the server computing systems 204. For example, the hardware profile analysis engine 212 determines that there are six total server computing systems 204 (e.g., chassis), and that the model types of the server computing systems 204 includes a first and a second model type (e.g., Dell EMC PowerEdge FX2, Dell PowerEdge M1000e).

Figure 3B:
FIG. 3B illustrates an example interface of grouping of the server computing systems for adding uplinks.
Figure 3C:
FIG. 3C illustrates an example interface of a grouping of the server computing systems for assigning ports to uplinks.

In some examples, when the hardware profile analysis engine 212 detects multiple model types (resource types) of the server computing systems 204, the system grouping engine 214 can group the server computing systems 204 by model type. Referring to FIG. 3B, the configuration management system 202 can provide for display on the GUI 220 an example interface 304 of a grouping of the server computing systems 204 for adding uplinks. For example, the interface 304 includes an option for selection of all of server computing systems 204 of the first model type (e.g., M1000e), the second model type (e.g., PowerEdge FX2), or all model types. Referring to FIG. 3C, the configuration management system 202 can provide for display on the GUI 220 an example interface 306 of a grouping of the server computing systems 204 for assigning ports of the respective server computing systems 204 of each model type to uplinks. Further, the interface 306 denotes configurations as complete (indicated by a check mark) or not finished (indicated as a waring icon).

Analyzing the hardware profile data 230 by the hardware profile analysis engine 212 can further include detecting, for each model type of the server computing systems 204, a module configuration of the server computing system 204. For example, the module configuration can include an input/output (I/O) module port profile configuration and/or fabric slots utilized. Specifically, the hardware profile analysis engine 212 can detect a same module configuration for a particular model type of the server computing system 204. The system grouping engine 214 can group the server computing systems 204 that have the same module configuration. For example, each of the server computing systems 204 can include SFP ports.

Figure 4A:
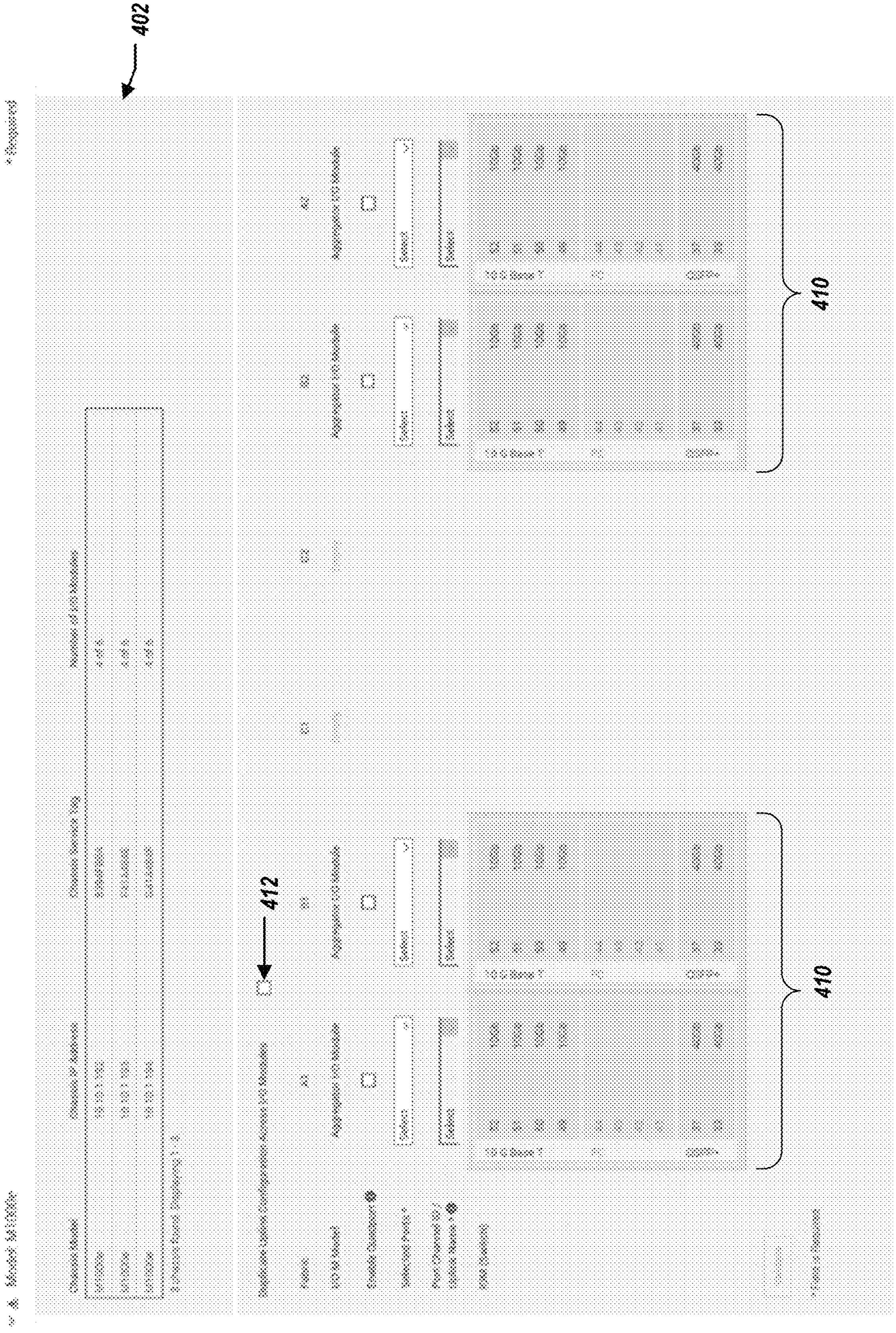
FIG. 4A illustrates an example interface of a first grouping of server computing systems with the same model type and module configuration, including the port types and fabric slots utilized.
Figure 4B:
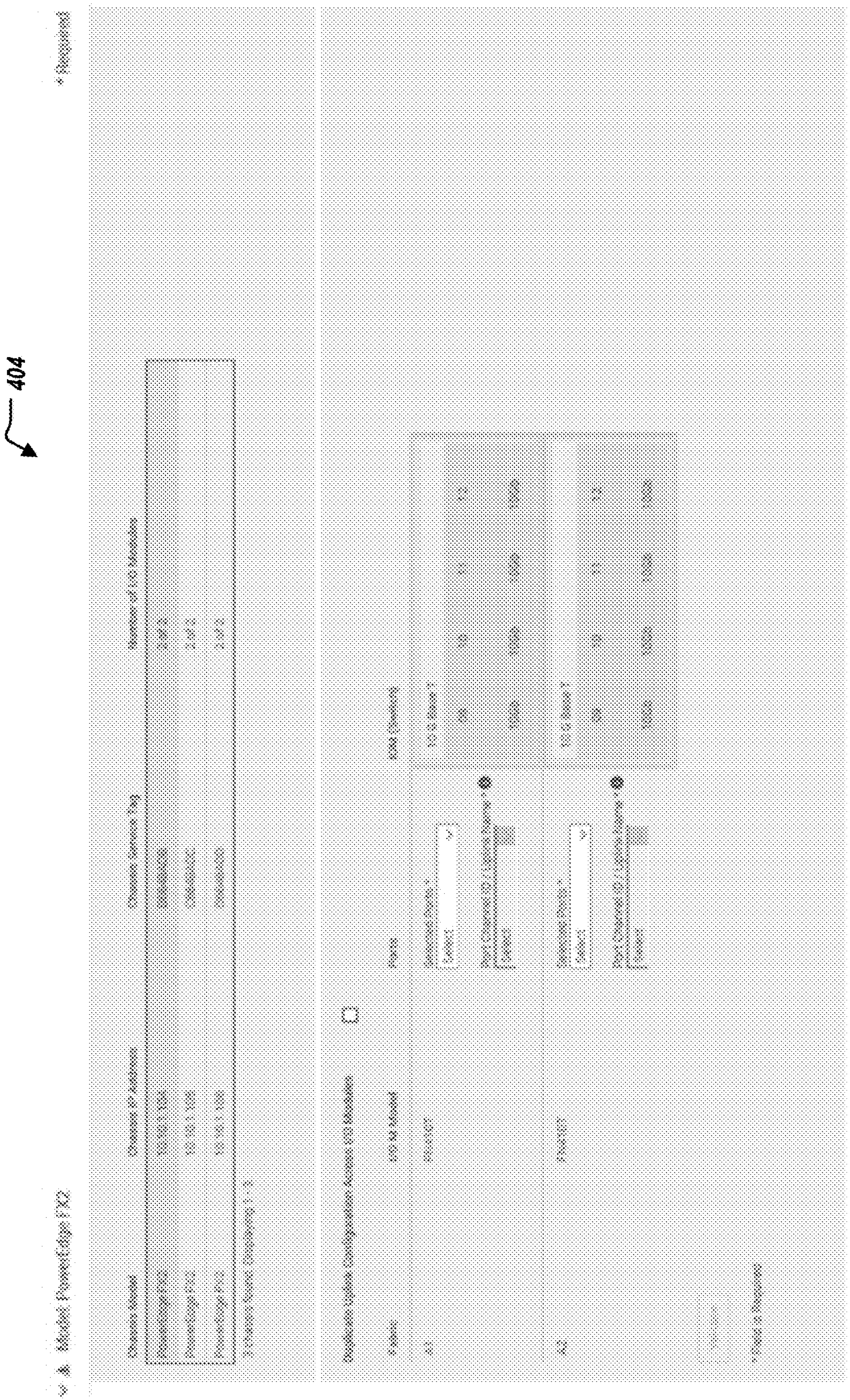
FIG. 4B illustrates an example interface of a second grouping of server computing systems consisting of the same model type and module configuration, including port types and fabric slots utilized.

In some implementations, the configuration management system 202, and in particular, the system grouping engine 214, groups, for each model type, each server computing system 204 that is associated with a same module configuration into a set (or grouping) of server computing systems. Referring to FIG. 4A, for example, the configuration management system 202 can provide for display on the GUI 220 an example interface 402 of a grouping of server computing systems 204 having a first model type of (e.g., M1000e) and having a same module configuration (e.g., QSP+, FC, 10 Base T, QSFP+, SFP). Referring to FIG. 4B, in another example, the configuration management system 202 can provide for display on the GUI 220 an example interface 404 of a grouping of server computing systems 204 having the first model type of (e.g., Dell EMC PowerEdge FX2) and having a same module configuration. In some implementations, the configuration management system 202, and in particular, the system grouping engine 214, provides for display on the GUI 220, data indicating, for each set of server computing systems 204, the model type and the module configuration of the set of server computing systems 204, for example, as shown in FIGS. 4A and 4B. In some examples, the configuration management system 202 can detect which ports of the server computing systems 204 can or cannot be configured. For example, FC ports of the server computing systems 204 are not allowed to be configured.

In some implementations, the configuration management system 202 can receive user input indicating selection of at least one set of server computing systems 204. For example, referring again to FIG. 4A, the server computing systems 204 having the same i) model type and ii) module configuration are formed into a set 410 of server computing systems 204. To that end, the interface 402 includes a user-selectable check box 412 to toggle selection of the set 410 of server computing systems 204.

In some implementations, the configuration management system 202, and in particular, the module configuration application engine 216, determines that, for at least one set of server computing systems 204, that a respective module configuration is to be applied globally based on the user input. Furthermore, the configuration management system 202, and in particular, the module configuration application engine 216, applies the respective module configuration to each set (or grouping) of server computing systems 204. For example, upon selection of the user-selectable check box 412, the module configuration application engine 216 can apply the appropriate module configuration to the set 410 of server computing systems 204.

Figure 5:
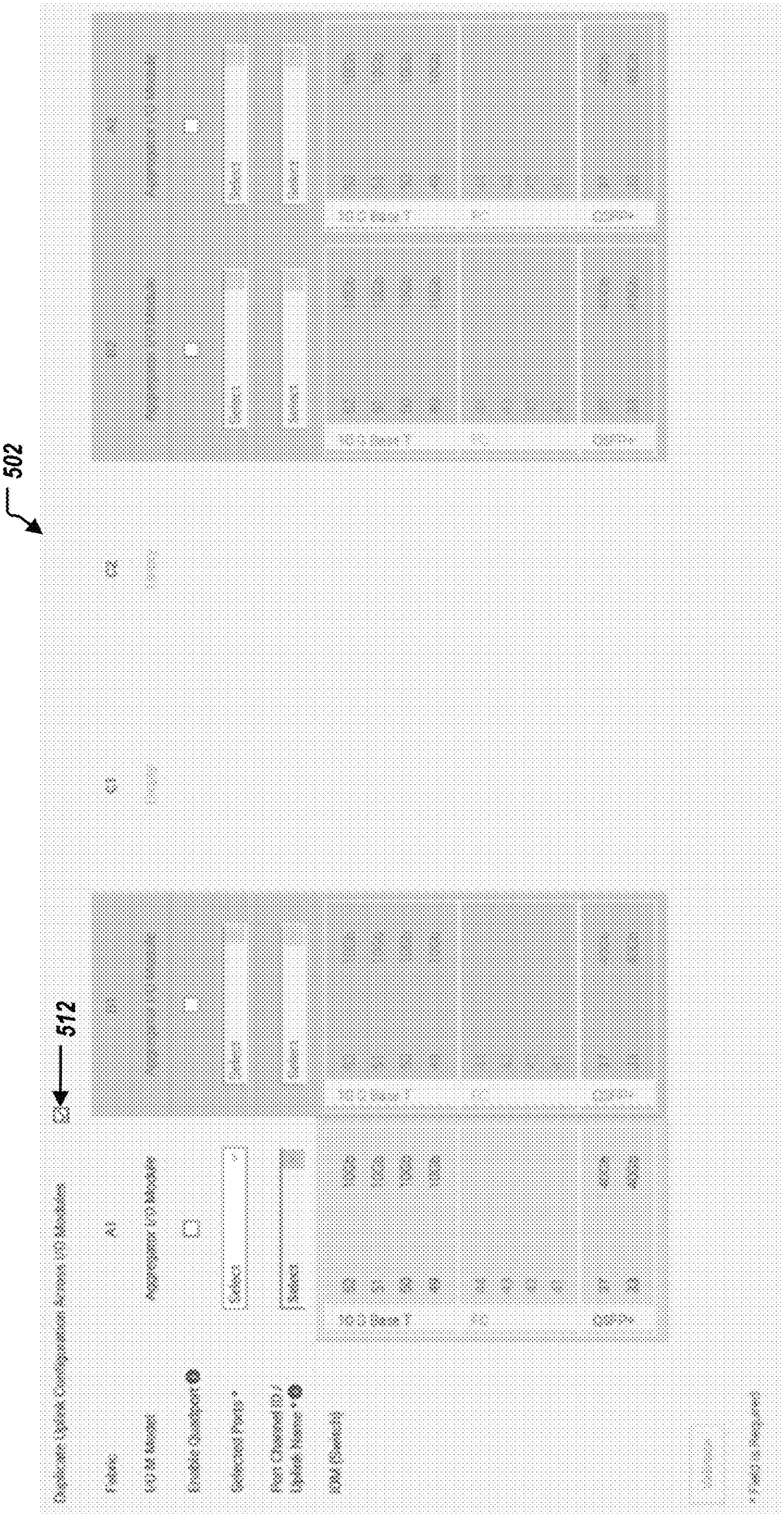
FIG. 5 illustrates an interface for duplicating module configurations across multiple fabrics of the server computing systems.

Referring to FIG. 5, the configuration management system 202 can provide for display on the GUI 220 an interface 502 illustrating configuration of the server computing systems 204. Specifically, interface 502 illustrates selection of the user-selectable check box 512, similar to the user-selectable check box 412 of FIG. 4A. When selected, the appropriate module configuration is applied to each of the server computing systems 204 of the set (indicated by fabrics A1, B1, B2, A2). Furthermore, configuration options for fabrics B1, B2, and A2 are disabled when the user-selectable check box 512 is selected.

Figure 6:
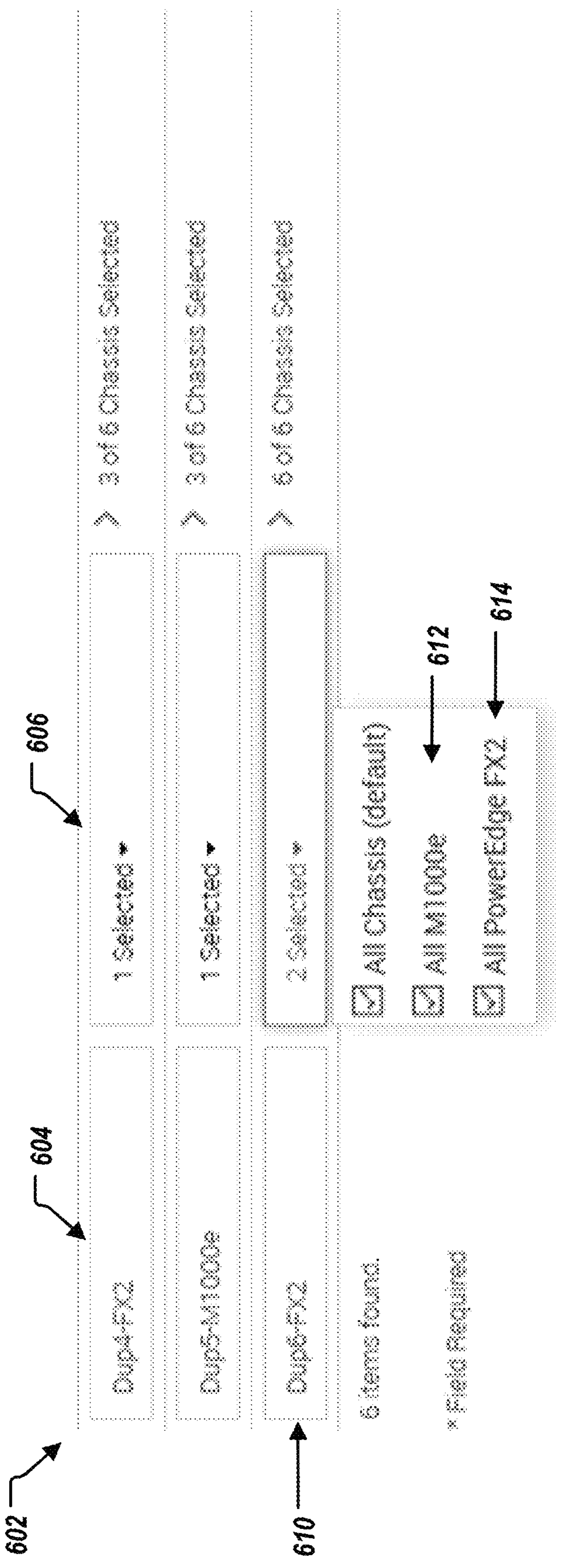
FIG. 6 illustrates an interface for application of module configurations to a set of server computing systems.

Referring to FIG. 6, the configuration management system 202 can provide for display on the GUI 220 an interface 602 for application of uplinks (module configurations) to a set of server computing systems 204. For example, the column 604 indicates the uplink configuration. The column 606 indicates the selection of the server computing systems 204 or a set of server computing systems 204 for application of the uplink configuration that is selected in the corresponding column 604. For example, the row 610 indicates that the first uplink configuration is being applied to the sets 612 and 614 of the server computing systems 204 (which also corresponds to each—or all—of the server computing systems 204). Additionally, the interface 602 provides for the selection of port channel identifications (IDs) for each uplink configuration. Specifically, the configuration management system 202, when a new uplink (module configuration) is generated for application to the server computing systems 204, generates an uplink configuration name that is unique as well as customizable (e.g., by a user of the configuration management system 202).

Figure 7:
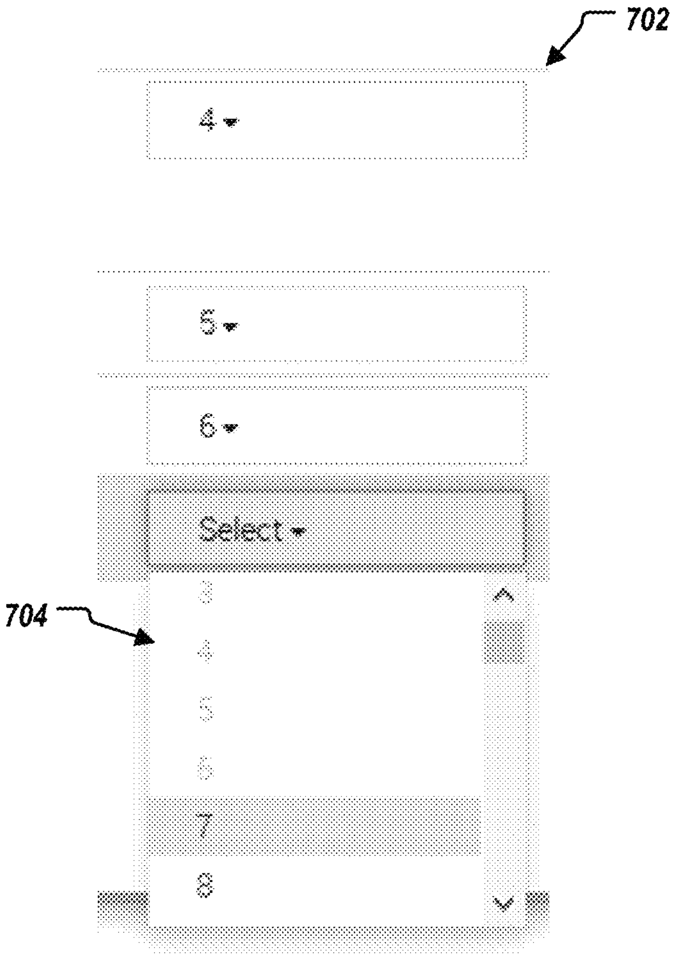
FIG. 7 illustrates an interface for selection of port channel IDs.

Referring to FIG. 7, the configuration management system 202 can provide for display on the GUI 220 an interface 702 for selection of port channel IDs. Specifically, the interface 702 provides a drop down listing 704 of available port channel IDs for selection of the appropriate uplink configuration. As port channel IDs are selected (e.g. by a user of the configuration management system 202), they are unavailable for subsequent selection, thus enabling uniqueness.

Figure 8A:
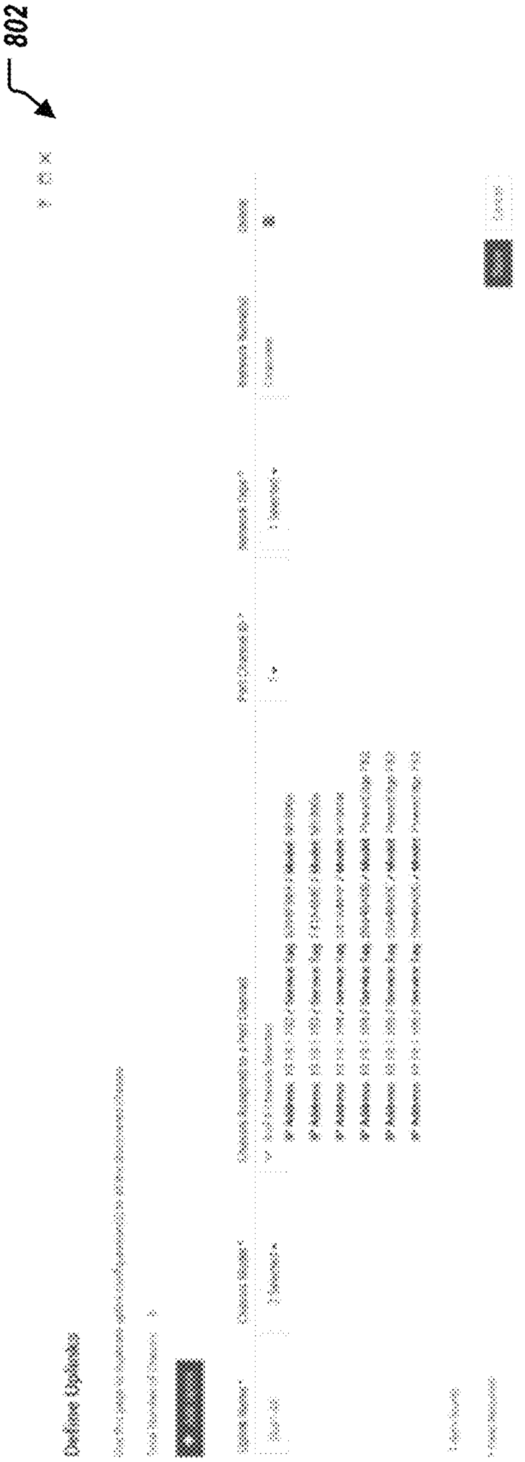
FIG. 8 illustrates an interface for defining uplink and port configuration.
Figure 8B:
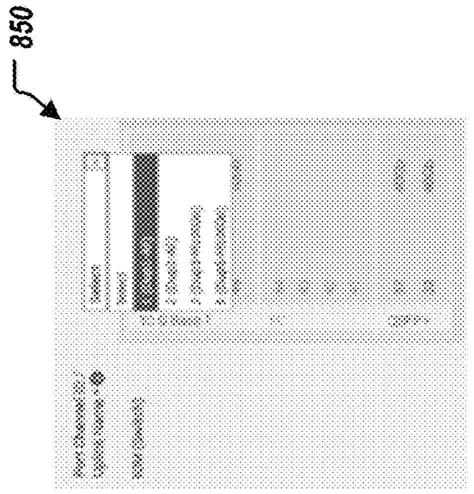

Referring to FIG. 8A, the configuration management system 202 can provide for display on the GUI 220 an interface 802 for defining uplinks. Specifically, for at least some of the modules, the ports of the module are configured based on the port type (e.g., by a user using the configuration management system 202) and are assigned a port channel ID. In some examples, each port is individually selected (e.g., by the user) to associate with each uplink. This process can be repeated for all uplinks and associated port channels to be configured on each module of each server computing system 204 and across utilized fabric slots. Referring to FIG. 8B, the configuration management system 202 can provide for display on the GUI 220 an interface 850 for configuring ports (e.g., ports 250).

Figure 9:
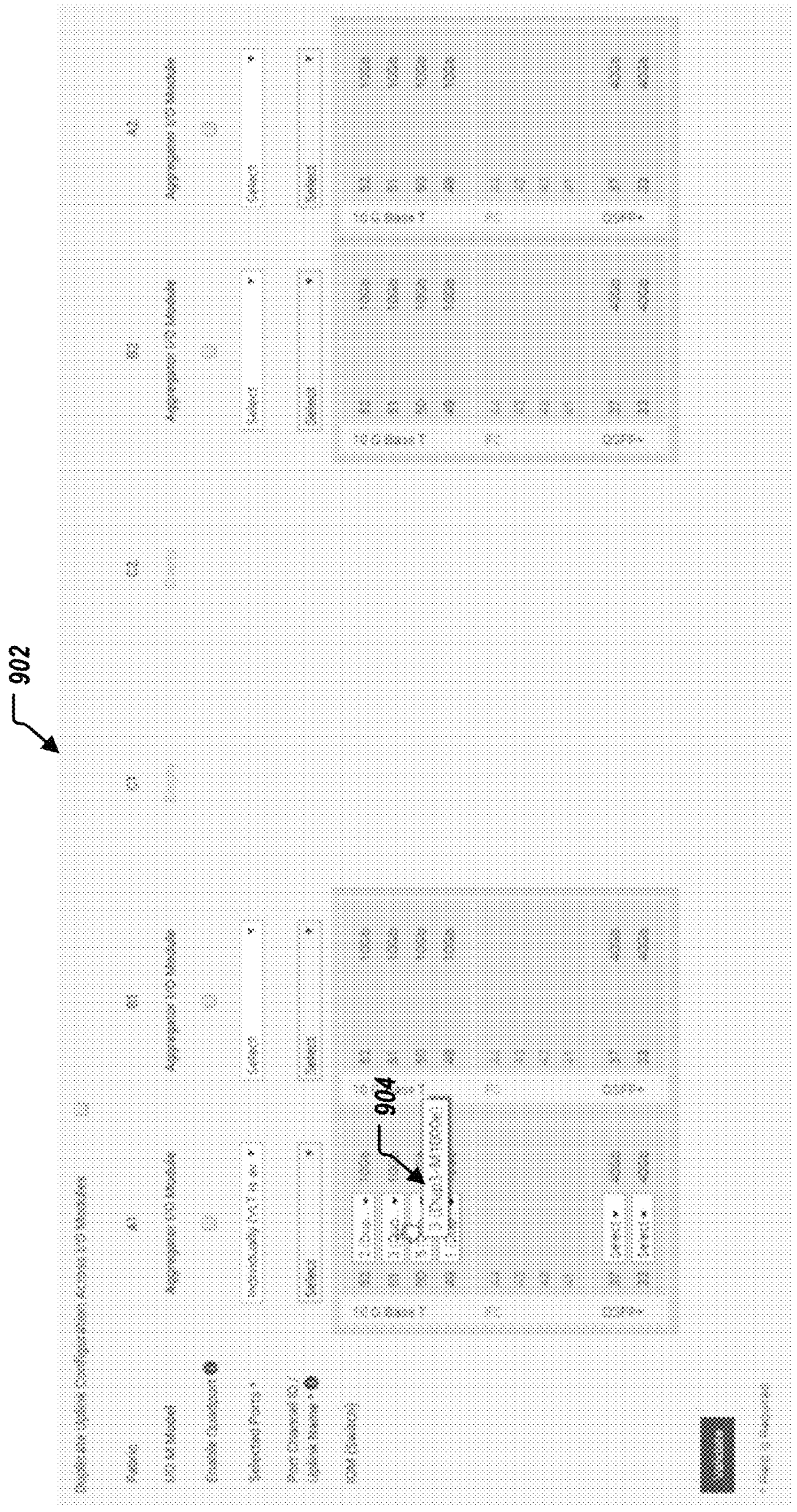
FIG. 9 illustrates an interface for configuration of ports.

Referring to FIG. 9, the configuration management system 202 can provide for display on the GUI 220 an interface 902 for configuration of the ports (e.g., ports 250). Specifically, the configuration management system 202, in some examples, can display only a limited of number of characters for the port channel ID (number) and uplink name in the port selection list on the interface 902. A hover action by a user-interactable selection cursor 904 can be enabled to view the entire textual description. The interface 902 additionally provide an abstract representation of the actual hardware (e.g., the server computing systems 204) as they would be orientated in a server rack. The configuration management system 202 can utilize the model type (e.g., resource type) of the server computing systems 204 to determine the layout of the server computing systems 204 within the server rack, e.g., vertical layout or horizontal layout. Further, the configuration management system 202 can utilize the module configuration to determine the slot alignment and port type.

In some examples, the configuration management system 202, and in particular, the hardware profile analysis engine 212, determines, for each model type of the server computing systems 204, that each module configuration differs (i.e., asymmetric). For example, the hardware profile analysis engine 212 determines that for a first model type of the server computing systems 204, that each module configuration differs—e.g., one module is SFP, and a differing module is QFSP+. In response to determining that each module configuration differs, the configuration management system 202, and in particular, the system grouping engine 214, groups each server computing system 204 that is associated with a same port type of the modules.

Figure 10A:
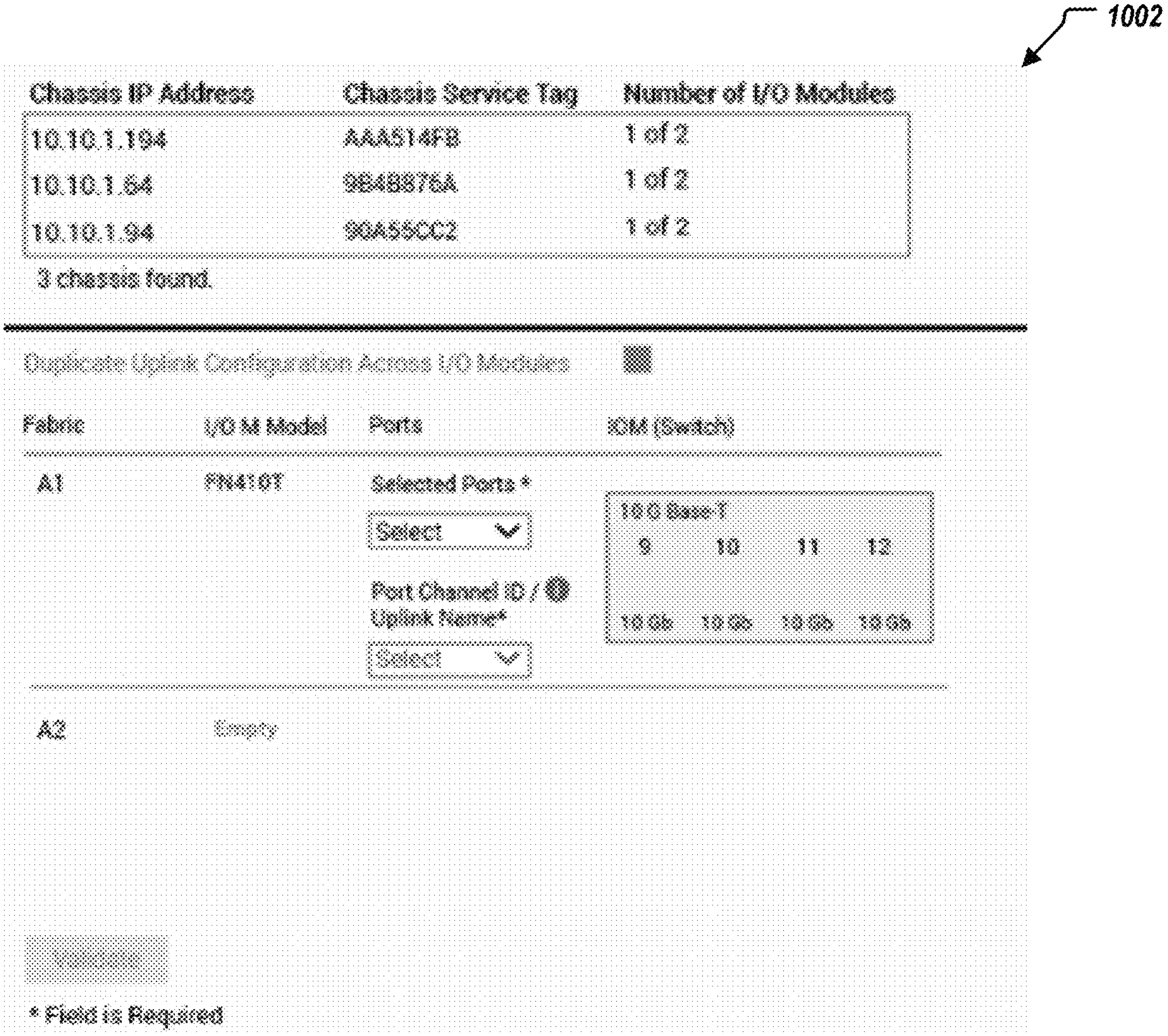
FIGS. 10A and 10B illustrate interfaces of module configurations of a server computing system.
Figure 10B:
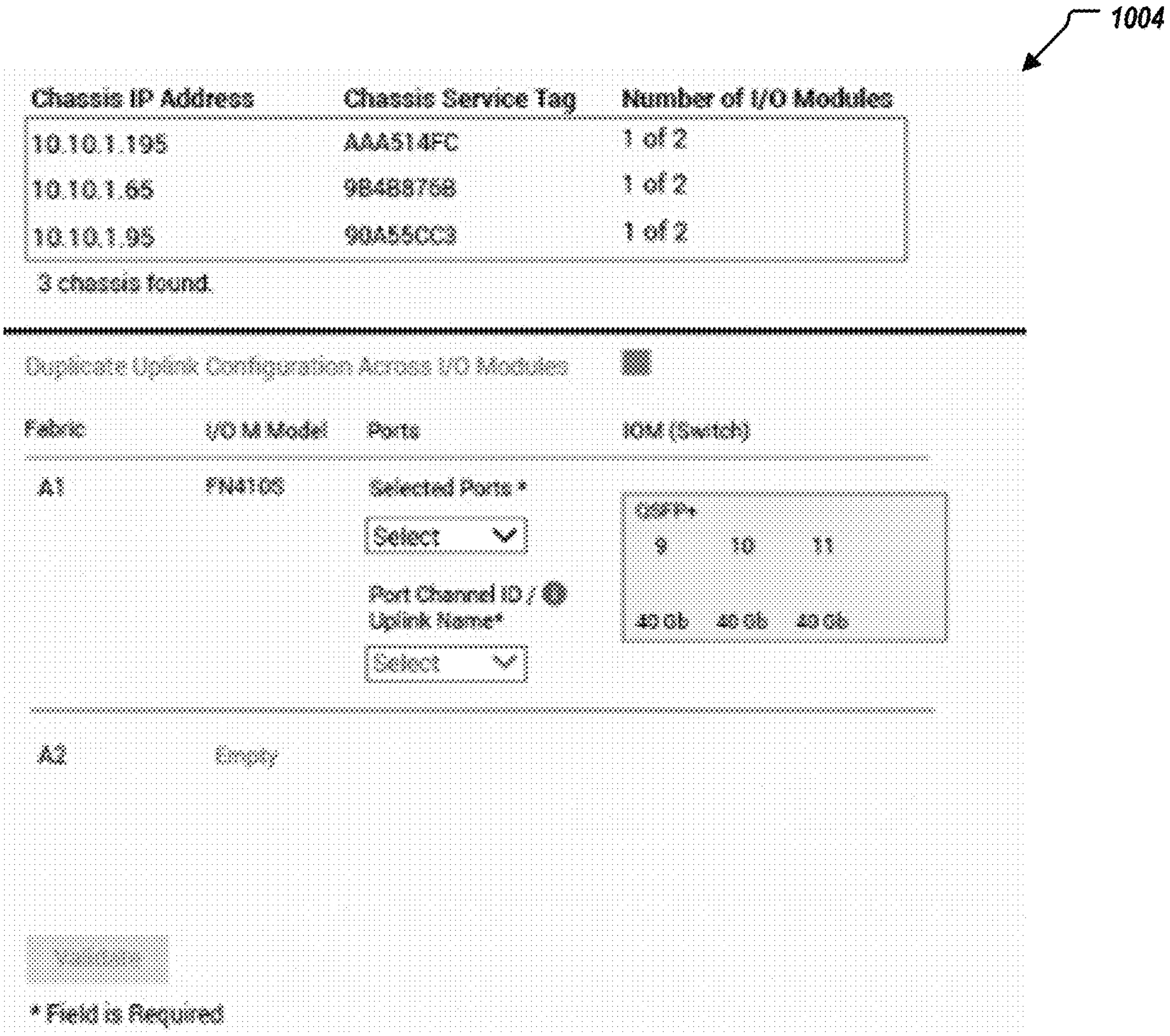

For example, referring to FIGS. 10A and 10B, the configuration management system 202 can provide for display on the GUI 220 a first interface 1002 illustrating a first module configuration of a server computing system 204, as shown in FIG. 10A; and a second interface 1004 illustrating a second, differing module configuration of a server computing system 204, as shown in FIG. 10B. Specifically, the interface 1002 include display of a 10 G Base-T module, and the interface 1004 includes display of a QSFP+ module.

In some examples, referring back to FIG. 2, the configuration management system 202 can update the hardware profile database 206 based on the received hardware data profiles 230, and specifically, the model type and the module configuration of each of the server computing systems 204. For example, the configuration management system 202 can provide data 260 to the database 206 to update one or more database tables stored by the hardware profile database 206 that include data regarding each server computing system 204, including model type and module configuration. The configuration management system 202 can further update the hardware profile database 206 to include data of sets (or groupings) of the server computing systems 204.

Figure 11:
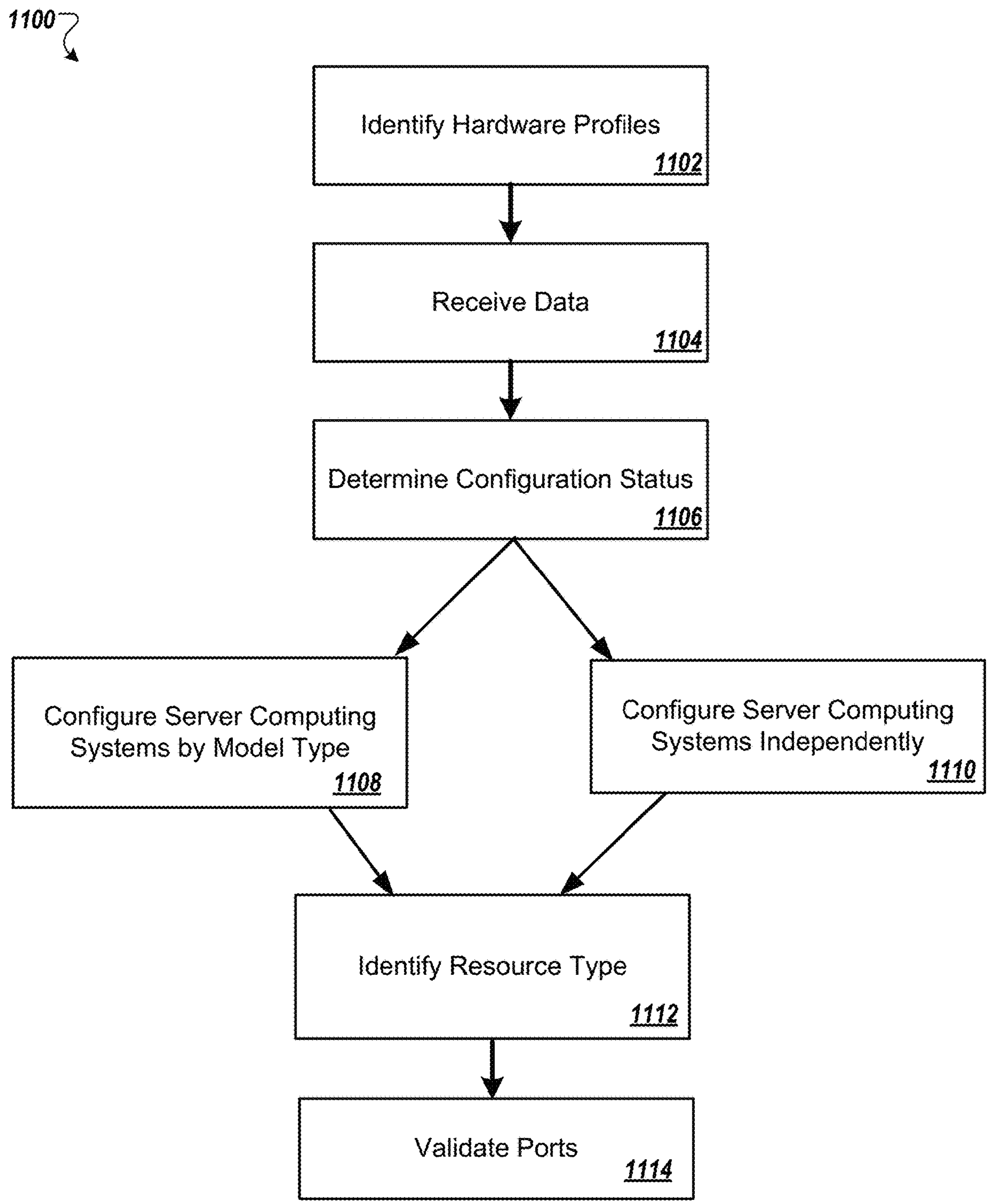
FIG. 11 illustrates a first flowchart depicting selected elements of an embodiment of a method for detecting and grouping of hardware profiles and corresponding server computing systems.

FIG. 11 illustrates a flowchart depicting selected elements of an embodiment of a method 1100 for detecting and grouping of hardware profiles and corresponding server computing systems. The method 1100 may be performed by the information handling system 200 and/or the configuration management system 202 described herein with reference to FIGS. 1 and 2, or another information handling system. It is noted that certain operations described in method 1100 may be optional or may be rearranged in different embodiments.

The configuration management system 202 identifies the hardware profiles 230 of the server computing systems 204 (1102). For example, the configuration management system 202 can discover visible hardware in the server computing systems 204, and provide the data, including the hardware profiles 230 to the user interface 220. The configuration management system 202 receives, from each server computing system 204, data indicating a configuration status of the respective server computing system 204 (1104). For example, the configuration status indicates whether each of the server computing systems 204 is configurable. In some examples, the configuration status includes .json data. In some examples, the configuration status can include an "all" mode indicating that the respective server computing system 204 is to be configured by model type by the configuration management system 202. In some examples, the configuration status can include an "independent" mode indicating that the respective server computing system 204 is to be configured independently by the configuration management system 202. In some examples, the data can further include an uplink configuration status of the respective server computing system 204. The uplink configuration status can indicate whether a respective configuration can be applied to the modules of the respective server computing system 204.

The configuration management system 202 can determine the configuration status of each server computing system 204 (1106). In some examples, the configuration management system 202 configures respective server computing systems 204 by model type (1108). In some examples, the configuration management system 202 configures respective server computing systems 204 independently (1110). The configuration management system 202 identifies the resource type of the server computing systems 204 (1112). For example, the configuration management system 202 identifies the model type of the server computing systems 204 (as identified by the hardware profile data 230). Based on the model type, the configuration management system 202 provides for display data associated with the respective server computing systems 204. For example, for a server computing system 204 of a particular model type, the configuration management system 202 renders the GUI 220 to include data indicating the particular model type and the module configuration. In some examples, the GUI 220 is rendered based on other fields in the received .json data (e.g., vertical, horizontal, or other format). The configuration management system 202 validates ports (e.g., ports 250) of each module of each server computing system 204 (1114). Specifically, the port validation engine 218 validates the ports by determining whether the respective configuration can be applied to the ports of the modules of the respective server computing systems 204. For example, the port validation engine 218 can validate the ports based upon other fields in the received .json data.

Figure 12:
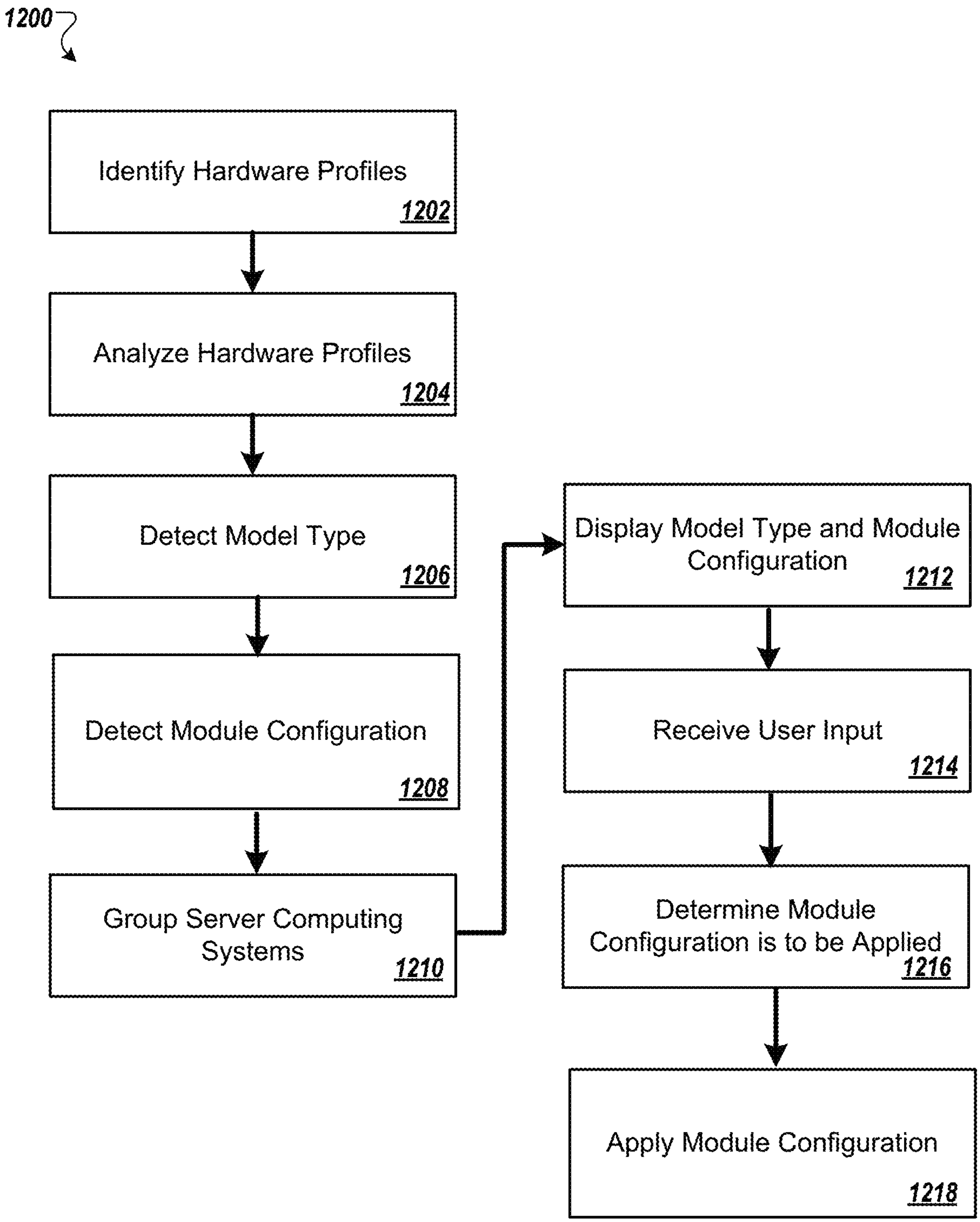
FIG. 12 illustrates a second flowchart depicting selected elements of an embodiment of a method for detecting and grouping of hardware profiles and corresponding server computing systems.

FIG. 12 illustrates a flowchart depicting selected elements of an embodiment of a method 1200 for detecting and grouping of hardware profiles and corresponding server computing systems. The method 1200 may be performed by the information handling system 100 and/or the configuration management system 202 described herein with reference to FIGS. 1 and 2, or another information handling system. It is noted that certain operations described in method 1200 may be optional or may be rearranged in different embodiments.

The configuration management system 202 identifies data indicating respective hardware profiles 230 of the server computing systems 204 (1202). For example, the hardware profile identification engine 210 can receive the hardware profile data 230 in response to a request provided to the server computing systems 204, or upon discovery of the server computing systems 204. The configuration management system 202 analyzes the hardware profiles 230 of the server computing systems (1204). The analyzing can include, for example, that the configuration management system 202 detects, for each of the server computing systems 204, a model type of the server computing system 204 (1206). For example, the hardware profile analysis engine 212 detects, for each of the server computing systems 204, a model type of the server computing system 204. Furthermore, the analyzing can include, for example, that the configuration management system 202 detects, for each model type of the server computing systems 204, a module configuration of the server computing system 204 (1208). For example, the hardware profile analysis engine 212 can detect a same module configuration for a particular model type of the server computing system 204.

The configuration management system 202 groups, for each model type, each server computing system that is associated with a same module configuration into a set of server computing systems (1210). For example, the system grouping engine 214 can group the server computing systems 204 that have the same module configuration. The configuration management system 202 provides, for display, data indicating, for each set of server computing systems 204, the model type and the module configuration of the set of server computing systems 204 (1212). The configuration management system 202 receives user input indicating selection of at least one set of server computing systems 204 (1214). The configuration management system 202 determines that for at least one set of server computing systems, that a respective module configuration is to be applied globally based on the user input (1216). The configuration management system 202 applies the respective module configuration to at least one set of server computing systems 204 (1218). For example, the module configuration application engine 216 applies the appropriate module configuration to the sets of server computing systems 204.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A configuration management system for configuring modules of server computing systems, the configuration management system including a processor having access to memory media storing instructions executable by the processor to perform operations comprising:

identify, by a hardware profile identification engine, respective hardware profiles of the server computing systems;

detect, by a hardware profile analysis engine and for each of the server computing systems, a model type of each of the server computing system;

detect, by the hardware profile analysis engine and for each model type of the server computing systems, a module configuration of each of the server computing system;

group, by a system grouping engine and for each model type, each of the server computing system that is associated with a same module configuration into a set of server computing systems;

provide for display, by the system grouping engine and for each set of the server computing systems, data indicating the model type and the module configuration of the set of the server computing systems;

determine, by a module configuration application engine and for at least one set of the server computing systems, that a respective module configuration is to be applied globally, the respective module configuration assigning one or more ports of the at least one set of the server computing systems to a unique uplink configuration, the assigning including identifying selected port channel identifications (IDs) for each unique uplink configuration such that subsequent selection of previously selected port channel IDs are made unavailable;

validate, for each port of each module of the server computing system, the port to determine whether the respective module configuration can be applied to the port, including detecting that i) a first subset of ports are configurable by respective module configurations and ii) a second subset of ports are not configurable by respective module configurations;

apply, by the module configuration application engine, the respective module configuration to only the ports that are configurable at the at least one set of the server computing systems;

update a database based on the model type and the module configuration of each of the server computing system;

determine, for each model type of the server computing systems, that each of the module configuration differs; and in response to the determining, group each the server computing system that is associated with a same port type of the modules.

2. The configuration management system of claim 1, wherein the hardware profile identification engine further receives, from the server computing system, data indicating a configuration status of respective server computing system, the configuration status indicating whether the respective server computing system is configurable.

3. The configuration management system of claim 1, wherein the hardware profile identification engine further receives, from the server computing system, data indicating an uplink configuration status of respective server computing system, the uplink configuration status indicating whether a respective configuration can be applied to the modules of the respective server computing system.

4. The configuration management system of claim 1, wherein the hardware profile analysis engine further identifies, for each model type of the server computing systems, a format of the modules of the server computing system, wherein the data indicating the model type and the module configuration for one or more of the server computing systems is provided for display by the configuration management system.

5. A computer-implemented method of configuring modules of server computing systems, the method comprising:

identifying, by a configuration management system, data indicating respective hardware profiles of the server computing systems;

analyzing, by the configuration management system, the hardware profiles, including:

detecting, for each of the server computing systems, a model type of each of the server computing system, and detecting, for each model type of the server computing systems, a module configuration of each of the server computing system;

grouping, by the configuration management system and for each model type, each of the server computing system that is associated with a same module configuration into a set of the server computing systems;

providing for display, for each set of the server computing systems, data indicating the model type and the module configuration of the set of the server computing systems;

receiving user input indicating selection of at least one set of the server computing systems;

determining, by the configuration management system and for at the least one set of the server computing systems, that a respective module configuration is to be applied globally based on the user input, the respective module configuration assigning one or more ports of the at least one set of the server computing systems to a unique uplink configuration, the assigning including identifying selected port channel identifications (IDs) for each unique uplink configuration such that subsequent selection of previously selected port channel IDs are made unavailable;

validating, for each port of each module of the server computing system, the port to determine whether the respective module configuration can be applied to the port, including detecting that i) a first subset of ports are configurable by respective module configurations and ii) a second subset of ports are not configurable by respective module configurations;

applying, by the configuration management system, the respective module configuration to the at least one set of the server computing systems;

updating a database based on the model type and the module configuration of the server computing system;

determining, for each model type of the server computing systems, that each module configuration differs; and in response to the determining, grouping each the server computing system that is associated with a same port type of the modules.

6. The method of claim 5, further comprising:

receiving, at the configuration management system and from the server computing system, data indicating a configuration status of respective server computing system, the configuration status indicating whether the respective server computing system is configurable.

7. The method of claim 5, further comprising:

receiving, at the configuration management system and from the server computing system, data indicating an uplink configuration status of respective server computing system, the uplink configuration status indicating whether a respective configuration can be applied to the modules of the server computing system.

8. The method of claim 5, further comprising:

identifying, for each model type of the server computing systems, a format of the modules of the server computing system; and providing for display, data indicating the model type and the module configuration for one or more of the server computing systems.

9. A non-transitory computer-readable medium storing software comprising instructions executable by one or more computers which, upon such execution, cause the one or more computers to perform operations comprising:

identifying, by a configuration management system, data indicating respective hardware profiles of a server computing systems;

analyzing, by the configuration management system, the hardware profiles, including:

detecting, for each of the server computing systems, a model type of each of the server computing systems, and detecting, for each model type of the server computing systems, a module configuration of each of the server computing systems;

grouping, by the configuration management system and for each model type, each of the server computing system that is associated with a same module configuration into a set of the server computing systems;

providing for display, for each set of the server computing systems, the model type and the module configuration of the set of the server computing systems;

receiving user input indicating selection of at least one set of the server computing systems;

determining, by the configuration management system and for the at least one set of the server computing systems, that a respective module configuration is to be applied globally based on the user input, the respective module configuration assigning one or more ports of the at least one set of the server computing systems to a unique uplink configuration, the assigning including identifying selected port channel identifications (IDs) for each unique uplink configuration such that subsequent selection of previously selected port channel IDs are made unavailable;

validating, for each port of each module of the server computing system, the port to determine whether the respective module configuration can be applied to the port, including detecting that i) a first subset of ports are configurable by respective module configurations and ii) a second subset of ports are not configurable by respective module configurations applying, by the configuration management system, the respective module configuration to the at least one set of the server computing systems;

updating a database based on the model type and the module configuration of each the server computing system;

determining, for each model type of the server computing systems, that each module configuration differs; and in response to the determining, grouping each the server computing system that is associated with a same port type of the modules.

10. The computer-readable medium of claim 9, the operations further comprising:

receiving, at the configuration management system and from the server computing system, data indicating a configuration status of respective server computing system, the configuration status indicating whether the respective server computing system is configurable.

11. The computer-readable medium of claim 9, the operations further comprising:

receiving, at the configuration management system and from the server computing system, data indicating an uplink configuration status of respective server computing systems, the uplink configuration status indicating whether a respective configuration can be applied to the modules of the server computing system.

12. The computer-readable medium of claim 9, the operations further comprising:

identifying, for each model type of the server computing systems, a format of the modules of the server computing system; and providing for display, data indicating the model type and the module configuration for one or more of the server computing systems.

* * * * *